Patented Feb. 21, 1933

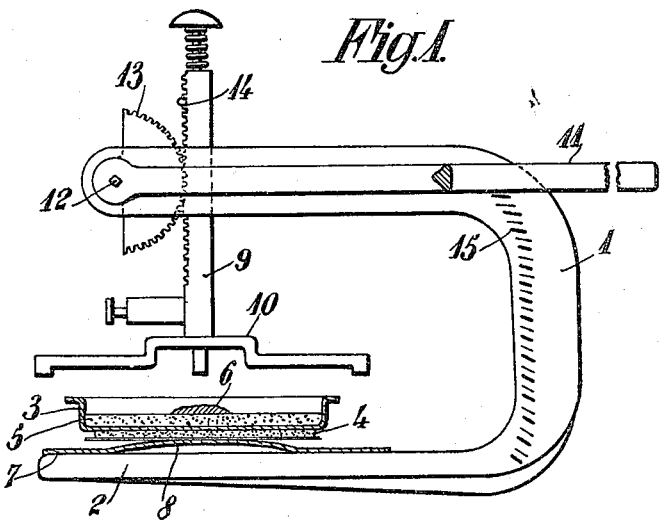
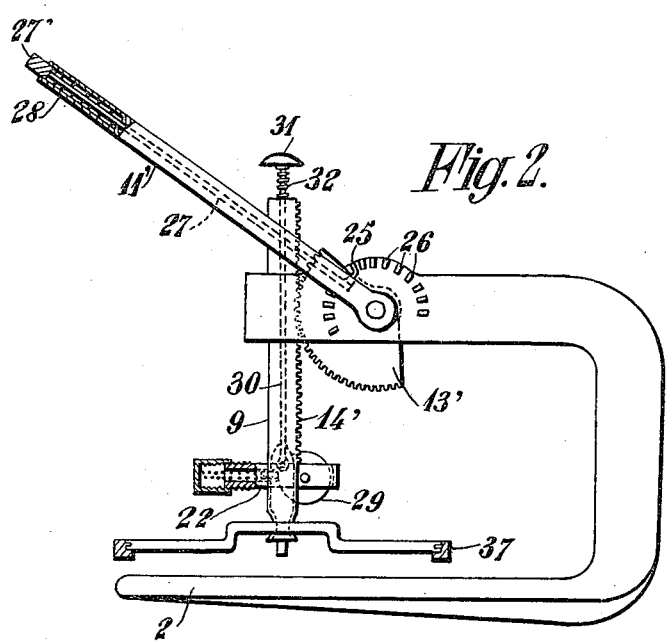

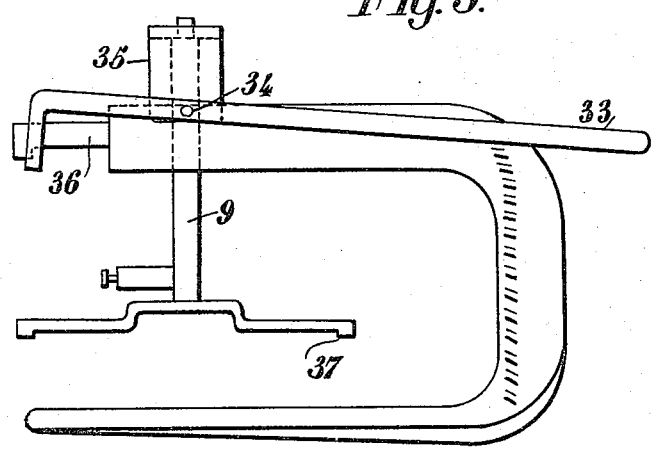
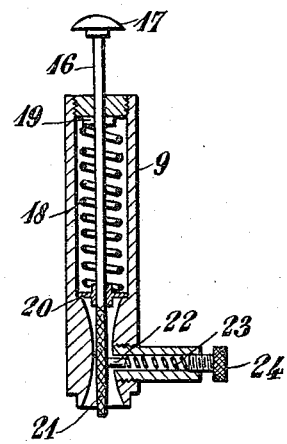
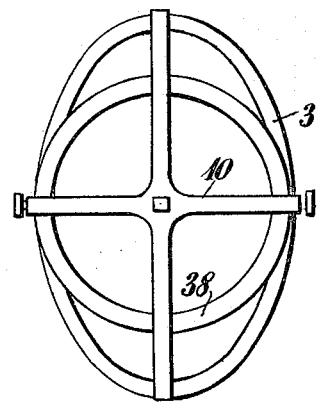

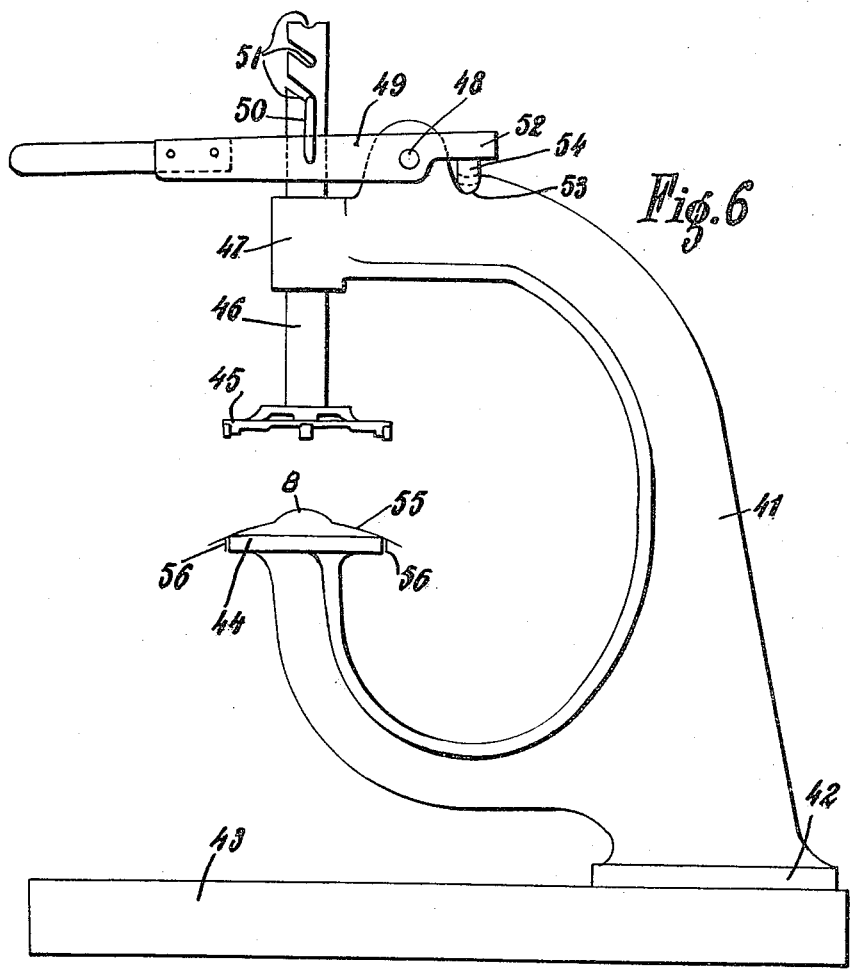

1,898,235

UNITED STATES PATENT OFFICE

ROBERT HENRI MARIE LOUIS BINAY, OF PARIS, FRANCE, ASSIGNOR TO OFFICE GENERAL DES SPECIALITES AUTOMOBILES, OF LA GARENNE-COLOMBES, SEINE, FRANCE, A JOINT-STOCK COMPANY OF FRANCE

REPAIRING ELEMENT FOR VULCANIZERS

Application filed September 29, 1930, Serial No. 485,200, and in France September 30, 1929.

The present invention relates to an automatic vulcanizer and to a heating composition to repair all rubber goods and more particularly inner tubes and tires, by vulcanizing directly thereon, at the place to be repaired, a pellet of gum or para containing the necessary sulfur and an accelerating product.

To this end, the pellet is stuck on the outside of a metallic basin containing, adhering thereto, a solid combustible substance the combustion of which develops the necessary heat, and a pellet of material that readily ignites, for example under the spark of a lighter, so as to burn the solid substance.

The invention is concerned with the special composition of the solid combustible substance which is constituted by a mixture of trioxymethylene with a solution of colophony in ethyl alcohol or concentrated gum arabic or fish glue in water.

The present invention likewise relates to the composition of the inflammable pellet which is composed of charcoal, potassium chlorate and a solution of colophony in ethyl alcohol.

The present invention is likewise concerned with the fact that the composition, after it has been placed in the basin, has a layer of gum lac spread over it, so as to be sheltered from the air seeing that it may remain a certain length of time without being used and that it is liable to disintegrate more or less rapidly in the air.

The present invention likewise relates to a press of the gooseneck type serving to press the pellet and the basin on the object to be vulcanized. In this press, clamping is effected by means of a claw, eccentric, cam, lock, etc., through the medium of a lever.

The invention is characterized by the fact that the clamping lever is maintained in the clamping position either by means of a pawl carried by it and which is pressed by a spring against a toothed segment, it being possible to lift said pawl by means of a push rod lying along the lever, or by hooking the lever on notches on the side or at the rear of the gooseneck of the press.

The invention is likewise concerned with the application of a series of interchangeable plates, which are placed on the press plate and which are bulged at the centre, the form of the bulges corresponding to that of the patches to be vulcanized on the inner tubes.

A crosspiece is used to clamp the several parts on the press plate; according to the invention the crosspiece is separate from the basin, on which it bears through the medium of a heat-insulating substance.

According to the invention likewise the crosspiece is completed by a metallic circle made of the same substance and which acts to regulate the flames.

In accordance with the invention, the central portion of the part which clamps the unit on the press plate is hollow and is provided within with a lighter which ignites the inflammable pellet placed on the substance supporting combustion.

This and other features of the invention will become apparent from the ensuing description taken into conjunction with the accompanying drawings which illustrate diagrammatically and by way of example an embodiment of the invention.

In the drawings:

Fig. 1 is a side view, partly in outside view, partly in section of a press according to the invention.

Fig. 2 is a similar view of a modification.

Fig. 3 is a similar view of another modification.

Fig. 4 is a sectional detail view.

Fig. 5 is a plan view of another detail.

Fig. 6 represents a modification of the press applicable to the particular case of pneumatic tires.

The press illustrated in Fig. 1, comprises a frame of gooseneck formation 1, at the lower end of which there is a plate 2. On this plate is placed the rubber article to be repaired, for example an inner tube for a tire, and above it is placed a small metallic basin 3 at the lower end of which is placed a pellet of plastic material 4, that is to say of para or non-vulcanized rubber which contains the necessary quantity of sulfur and an accelerator product. In the basin is a solid combustible composition 5, and on said combustible material is placed a pellet 6 made of easily inflammable material. The basin 3 is round, oval or oblong depending on the nature of the repair to be effected; the pellet 4 which is stuck on to its lower end is of course likewise of the same size. The solid material 5 supplies by combustion the heat necessary for vulcanizing the pellet 4. The composition of this material is as follows: to 175 parts by weight of trioxymethylene are admixed 100 parts by weight of one of the following solutions: *a.* 90 grammes of colophony in a litre of ethyl alcohol. *b.* 50 grammes of concentrated gum arabic or fish glue in a litre of water.

One of these mixtures is placed in the basin 3 where it solidifies so as to adhere to the basin; a sufficient quantity is added so that the combustion of this substance creates the necessary temperature during the requisite time for the rubber 4 to be completely vulcanized.

As has been stated above, there is placed on the substance 5 a pellet 6 made of readily inflammable material and which will cause the substance 5 to ignite. Approximately one gramme of this substance which has the following composition is taken: 25 grammes powdered charcoal (preferably poplar charcoal is used), 120 grammes of potassium chlorate $KClO^3$, and 100 grammes of a solution of 90 grammes of colophony in a litre of ethyl alcohol.

In order to protect the substances prior to use, they are wrapped in paper or parchmentized cardboard and paraffined. Similarly the layer of rubber 4 is protected by means of suitable paper, the basin and the several substances fixed thereto forming an entity with which repairs can be carried out and which is placed on the market in this condition.

Before placing the several elements stated above namely: the inner tube to be repaired, the basin, etc., on the plate 2 of the press, there is placed on the latter a plate 7 having a bulging central part, the bulge of which corresponds to the form of the patch to be stuck on the inner tube. A set of plates is provided having different bulges so as to correspond to the different forms of patches. When the lever 11 is depressed, the vertical edges of the basin 3 immediately come into contact with the plate 7, the bottom of the basin and the layer of plastic rubber 4 bending into the same curve as the plate 7. The layer of plastic rubber is then crushed and fills the space until its vertical edges contact with the plate 7 and form, at the point of contact, a perfect level.

The above unit is clamped on the plate of the press by means of a rod 9 sliding in the upper arm of the gooseneck 1 and carrying at its lower end a crosspiece 10 the legs of which are brought to bear against the edges of the basin 3. The rod 9 is clamped by means of a lever 11 pivoted at 12 at the end of the upper arm of the gooseneck and on the pivot pin of which is mounted a toothed segment 13 meshing with a rack 14 of the rod 9. Hence, by pressing on the lever 11, the rod 9 and the crosspiece 10 may be lowered with the necessary force to supply sufficient pressure to the several parts. Once the pressure has been obtained these parts are maintained in place due to the fact that on the side of the gooseneck 1 are formed a certain number of notches 15 with one of which a suitable edge of the lever 11 is engaged.

To uncouple the parts subsequently, it is only necessary after having pressed slightly on the lever 11 to shift it a little to one side before releasing it from the notches 15.

To ignite the pellet 6 any appropriate means may be used, but preferably the apparatus described above is fitted with a lighter device allowing of self lighting of the pellet 6. This lighter device is located within the rod 9; it may be of any suitable type, and, in particular, of the type illustrated in Fig. 4. In this case, the apparatus includes a central stem 16 provided at its upper part with a presser knob 17, said stem sliding within the rod 9 and being retained in its raised position due to the action of a spring 18 bearing on the one hand against a shoulder 19 provided to this end on the stem 16, and, on the other hand, on a plate 20 located at the lower end of the recess formed in the rod 9.

This plate moreover acts as a guideway for the rod 16 at its lower end. The end 21 of the rod 16 has a rough surface and can rub against a stone 22 made of ferrocerium pressed against it through the agency of a spring 23 which is pressed in its turn by a screw 24 in the usual manner in lighter devices. By depressing the presser knob 17, the portion 21 is rubbed against the ferrocerium stone 22 thereby producing a spark in the direction of displacement, said spark consequently striking the pellet 6.

Another embodiment of the lever mechanism for operating the rod 9 has been illustrated in Fig. 2. In this case the lever 11' instead of being directed towards the inside of the mounting of the gooseneck press, is directed outwardly and is connected, as in the previous case, to a toothed segment 13' meshing with a rack 14' carried by the rod 9 of the press. The lever is blocked in the clamping position by means of a pawl 25 adapted to engage with one of the corresponding notches 26 provided to this end on the press mounting. The pawl is mounted at the end of a link 27 sliding in the rod 11'. It is held in its engaging position by means of a spring 28 situate at the upper part of the lever 11'. Finally, the link 27 is terminated by a knob 27'. By pressing this knob the spring 28 is pressed and the pawl 25 released from the notch in which it is engaged, whereby the lever may be rotated and released.

In Fig. 2 has likewise been illustrated a lighter device differing slightly from the one just described and which is constituted by a roller 29 rubbing against the ferrocerium stone 22, said roller being rotated by a link 30 at the end of which there is a presser knob 31. The link 30 is held normally in its raised position by means of a spring 32 located between the presser knob 31 and the upper portion of the rod 9. By pressing on the knob 31 the roller produces a spark extending in the direction of displacement and which strikes the pellet 6 situated below in the manner previously described.

Another modification of the press has been illustrated in Fig. 3, according to which the lever 33 is removable and simply carries a stirrup 35 pivoting thereon as at 34. The end of the lever has an opening fitting on a tenon 36 carried by the upper portion of the press. Moreover the stirrup 35 fits on to the upper portion of the rod 9.

After having fitted the end of the lever over the tenon 36 and the stirrup 35 on the rod 9, by pressing on the lever 33, pressure is exerted on the rod 9 since the lever bears against the tenon 36, said lever being prevented from sliding on the tenon due to the fact that the outer end of the latter is enlarged so as to provide a stop preventing the lever 33 from moving outwardly. The lever 33 is held in the clamping position by means of a plurality of notches provided on the side of the mounting of the press in the manner previously explained in connection with Fig. 1.

Whatever the device utilized may be, a heat-insulating lagging 37 is placed over the ends of the clamping crosspiece 10 to prevent the inner tube from contacting with the basin or crosspiece; the metal being a heat conductor, could burn the inner tube if the latter were not insulated therefrom.

On the legs of the crosspiece exerting pressure on the edges of the basin 5 is fixed a ring 38 which serves to regulate the flame in the particular instance in which basins of oblong form are used. In this case, the surface of the material exposed to the air being larger than in the case in which the basin is circular, the material could burn too rapidly and not heat the patch for the length of time required. Said ring 38 located above an oblong basin, as may be seen in Fig. 5, checks too rapid a propagation of the flame towards the outer parts and also limits to a certain extent the surface exposed to the air; thus the combustion is retarded in the manner indicated above.

In Figure 6 has been illustrated another modification of the press intended more particularly for repairing pneumatic tires. Said press is, of course, larger than those described above which are designed solely for repairing inner tubes. It is more particularly intended to be used in workshops or in garages; consequently, said press, which constituted by a gooseneck portion 41, is provided at its lower end with a base 42 enabling it to be fixed by bolts or in any other manner on a table or on a bench 43. Said press comprises a lower plate 44 and an upper plate of similar form to that previously described and which is suspended at the lower end of a rod 46. Said rod 46 slides in a suitable bore formed to this effect at the end 47 of the upper arm of the gooseneck. On this arm is pivotally mounted at 48 a lever 49 preferably constituted by two parallel arms embracing the rod 46. On the arms 49 is mounted a stirrup 50 the horizontal transverse arm of which can penetrate in notches 51 formed in the rod 56 either laterally or at the upper portion of said rod. The lever 49 is extended at 52 beyond its pivot point 48 and below said extension there is formed in the arm of the press a notch 53 into which can penetrate a key 54 which is fairly sharply conical.

Said press is used in the following manner:—

The tire to be repaired is placed on the lower plate 44 in such a manner that the place at which a patch is to be fixed shall be opposite the upper plate 45. There is then placed on the tire at this place the basin such as the one previously described and below which is placed a sheet of para including the necessary ingredients for vulcanizing. The upper plate is lowered by causing the rod 46 to slide in the arm 47, the lever 49 being at that moment raised and the stirrup 50 being out of engagement with one of the notches 51. When the plate 45 is thus in position, pressing against the tire, the lever 49 is depressed and the stirrup 50 is made to penetrate into the nearest notch, the key 54 is then put in place and pushed down to the greatest possible extent.

Due to the conical shape of the key, when it is pushed down it raises the arm 52 of the lever 49 and causes the latter to pivot anti-clockwise when viewing the figure. The portion 49 of the lever is lowered, carrying with it the stirrup 50 and, consequently, rod 46. The tire and the basin above it are thus well gripped one against the other between the two plates of the press. The composition is then ignited by means of the inflammable pellet and the heat given off, in combination with the pressure produced in the manner just described, vulcanizes into position the sheet of para which rests on the tire.

Since pneumatic tires are of circular cross-section and have a certain thickness, if the tire were gripped between two parallel plates, the pressure would not be uniformly distributed over the whole surface pressed by the plates since if one of the faces of the tire were flat, the other would not be so.

To obviate this drawback, a steel spring plate 55, arched in the manner shown in the drawings, is placed on the lower plate 44 of the press. Two tabs 56 whose width apart is the same as that of the plate 44, are cut out and struck up from the plate 55. Said tabs thus enable the plate 55 to be fixed on the plate 44. In addition to the tire and a basin when the device together with the tire and a basin are pressed between two plates, the lower part of the tire remains slightly rounded thus affording a plain surface for the upper part and the pressure applied to the press will be uniformly exerted on said latter surface. The plate 55 being moreover flexible, yields to the requisite extent and at the points desired so that the pressure is uniformly distributed over the lower and the upper surface at the place where the repair is to be carried out.

Moreover, there is provided with each press a set of plates of different curvatures so as to fit the different points of the cross-section of a tire, for, as is well-known, the outer and inner surfaces of a tire have not the same difference of curvature at various points of the cross-section. Moreover, it is advisable to bend the plates not only in the transverse direction as illustrated in the drawings, but likewise in the direction perpendicular thereto, so as to be able to yield elastically in a transverse direction if needs be, and thus ensure that the pressure is uniform at all points of the metallic basin.

I claim:

1. A repairing element for a vulcanizer, comprising a metal basin, a rubber patch impregnated with sulphur and secured to the under face of said basin and a combustible substance containing trioxymethylene and placed within the basin.

2. A repairing element for a vulcanizer, comprising a metal basin, a rubber patch impregnated with sulphur and secured to the under face of said basin, and a combustible substance inside the basin comprising a mixture of trioxymethylene and a solution of colophony in ethyl alcohol.

3. A repairing element for a vulcanizer, comprising a metal basin, a rubber patch impregnated with sulphur and secured to the under face of said basin, and a combustible substance inside the basin comprising a mixture of trioxymethylene and a solution of gum arabic in water.

4. A repairing element for a vulcanizer, comprising a metal basin, a rubber patch impregnated with sulphur and secured to the under face of said basin, and a combustible substance inside the basin comprising a mixture of trioxymethylene and a solution of fish glue in water.

5. A repairing element for a vulcanizer, comprising a metal basin, a rubber patch impregnated with sulphur and secured to the under face of said basin, and a combustible substance inside the basin comprising a mixture of 175 parts by weight of trioxymethylene and 100 parts by weight of a solution of colophony in ethyl alcohol.

6. A repairing element for a vulcanizer, comprising a metal basin, a rubber patch impregnated with sulphur and secured to the under face of said basin, and a combustible substance inside the basin comprising a mixture of 175 parts by weight of trioxymethylene and 100 parts by weight of a solution of gum arabic in water.

7. A repairing element for a vulcanizer, comprising a metal basin, a rubber patch impregnated with sulphur and secured to the under face of said basin, and a combustible substance inside the basin comprising a mixture of 175 parts by weight of trioxymethylene and 100 parts by weight of a solution of fish glue in water.

8. A repairing element for a vulcanizer, comprising a metal basin, a rubber patch impregnated with sulphur and secured to the under face of said basin, and a combustible substance inside the basin comprising a mixture of 175 parts by weight of trioxymethylene and 100 parts by weight of a solution of 90 grammes of colophony in one litre of water.

9. A repairing element for a vulcanizer, comprising a metal basin, a rubber patch impregnated with sulphur and secured to the under face of said basin, and a combustible substance inside the basin comprising a mixture of 175 parts by weight of trioxymethylene and 100 parts by weight of a solution of 50 grammes of gum arabic in one litre of water.

10. A repairing element for a vulcanizer, comprising a metal basin, a rubber patch impregnated with sulphur and secured to the under face of said basin, and a combustible substance inside the basin comprising a mixture of 175 parts by weight of trioxymethylene and 100 parts by weight of a solution of 50 grammes of fish glue in one litre of water.

ROBERT HENRI MARIE LOUIS BINAY.